United States Patent
Bailey et al.

(10) Patent No.: US 9,508,124 B2
(45) Date of Patent: Nov. 29, 2016

(54) METHOD OF SHUTTERLESS NON-UNIFORMITY CORRECTION FOR INFRARED IMAGERS

(71) Applicant: DRS Network & Imaging Systems, LLC, Melbourne, FL (US)

(72) Inventors: John R. Bailey, Merritt Island, FL (US); Rustin W. Allred, West Melbourne, FL (US)

(73) Assignee: DRS Network & Imaging Systems, LLC, Melbournce, FL (US)

(*) Notice: Subject to any disclaimer, the term of this patent is extended or adjusted under 35 U.S.C. 154(b) by 0 days.

(21) Appl. No.: 14/964,165

(22) Filed: Dec. 9, 2015

(65) Prior Publication Data

US 2016/0086315 A1    Mar. 24, 2016

Related U.S. Application Data

(62) Division of application No. 14/211,796, filed on Mar. 14, 2014, now Pat. No. 9,251,595.

(60) Provisional application No. 61/794,200, filed on Mar. 15, 2013.

(51) Int. Cl.
*G06K 9/40* (2006.01)
*G06T 5/00* (2006.01)
(Continued)

(52) U.S. Cl.
CPC .............. *G06T 5/00* (2013.01); *G06T 5/005* (2013.01); *G06T 7/0085* (2013.01); *G06T 7/20* (2013.01); *H04N 5/33* (2013.01); *G06T 2207/10048* (2013.01)

(58) Field of Classification Search
CPC ......... G06T 5/00; G06T 5/40; G06T 7/0085; G06T 7/20; G06T 2207/10048; H04N 5/33
See application file for complete search history.

(56) References Cited

U.S. PATENT DOCUMENTS

| 5,323,334 A | 6/1994 | Meyers et al. |
| 5,335,091 A | 8/1994 | Palum |

(Continued)

FOREIGN PATENT DOCUMENTS

| EP | 0483530 A2 | 5/1992 |
| EP | 0600742 A1 | 6/1994 |

(Continued)

OTHER PUBLICATIONS

International Search Report and Written Opinion mailed Aug. 27, 2014 in Int'l Patent Application No. PCT/US2014/028922, 10 pages.

(Continued)

*Primary Examiner* — Amir Alavi
(74) *Attorney, Agent, or Firm* — Kilpatrick Townsend & Stockton LLP

(57) ABSTRACT

A method of correcting an infrared image including a plurality of pixels arranged in an input image array, a first pixel in the plurality of pixels having a first pixel value and one or more neighbor pixel with one or more neighbor pixel values. The first pixel and the one or more neighbor pixels are associated with an object in the image. The method includes providing a correction array having a plurality of correction pixel values, generating a corrected image array by adding the first pixel value to a correction pixel value in the correction array, and detecting edges in the corrected image array. The method also includes masking the detected edges in the corrected image array, updating the correction array, for each correction pixel value in the correction array and providing an output image array based on the correction array and the input image array.

10 Claims, 10 Drawing Sheets

(51) Int. Cl.
*G06T 7/00* (2006.01)
*G06T 7/20* (2006.01)
*H04N 5/33* (2006.01)

(56) References Cited

U.S. PATENT DOCUMENTS

| | | | |
|---|---|---|---|
| 5,350,911 | A | 9/1994 | Rafanelli et al. |
| 5,514,865 | A | 5/1996 | O'Neil |
| 5,717,208 | A | 2/1998 | Woolaway, II |
| 5,798,875 | A | 8/1998 | Fortin et al. |
| 5,811,808 | A * | 9/1998 | Cannata .......... G01J 5/22 250/332 |
| 5,838,813 | A | 11/1998 | Kancler et al. |
| 5,994,699 | A * | 11/1999 | Akagawa .......... H04N 5/33 250/332 |
| 6,011,584 | A | 1/2000 | Allred et al. |
| 6,573,819 | B1 | 6/2003 | Oshima et al. |
| 7,370,975 | B2 * | 5/2008 | Taniguchi .......... G08G 1/166 348/148 |
| 7,421,152 | B2 | 9/2008 | Kang |
| 7,622,715 | B2 | 11/2009 | Ignatowicz |
| 7,924,312 | B2 | 4/2011 | Packard |
| 7,995,859 | B2 * | 8/2011 | Hogasten .......... G06T 5/50 382/275 |
| 7,996,066 | B2 | 8/2011 | Schlagheck et al. |
| 8,189,050 | B1 * | 5/2012 | Hughes .......... H04N 5/33 348/162 |
| 8,247,770 | B2 | 8/2012 | Fischer |
| 8,373,757 | B1 | 2/2013 | Nguyen |
| 8,476,590 | B2 | 7/2013 | Stratmann et al. |
| 8,478,480 | B2 | 7/2013 | Mian et al. |
| 8,494,220 | B2 | 7/2013 | Del Grande |
| 8,649,932 | B2 | 2/2014 | Mian et al. |
| 8,787,619 | B2 | 7/2014 | Del Grande |
| 8,868,291 | B2 | 10/2014 | Mian et al. |
| 9,071,720 | B2 * | 6/2015 | Ikari .......... H04N 1/02815 |
| 9,251,595 | B2 * | 2/2016 | Bailey .......... G06T 5/005 |
| 2004/0208395 | A1 * | 10/2004 | Nomura .......... G06T 5/20 382/275 |
| 2004/0232333 | A1 | 11/2004 | Guldevall |
| 2010/0030506 | A1 | 2/2010 | Cairnduff |
| 2011/0063427 | A1 | 3/2011 | Fengler et al. |
| 2011/0159959 | A1 | 6/2011 | Mallinson et al. |
| 2011/0169961 | A1 * | 7/2011 | Wu .......... G01J 5/02 348/164 |
| 2012/0091340 | A1 | 4/2012 | Young |
| 2012/0162508 | A1 | 6/2012 | Okuda |
| 2012/0224019 | A1 | 9/2012 | Samadani et al. |
| 2013/0050453 | A1 | 2/2013 | Bergstrom et al. |
| 2013/0083199 | A1 | 4/2013 | Choi et al. |
| 2013/0088604 | A1 | 4/2013 | Hamrelius et al. |
| 2013/0345545 | A1 | 12/2013 | Gross et al. |
| 2014/0253735 | A1 | 9/2014 | Fox et al. |
| 2015/0281598 | A1 | 10/2015 | Southerland et al. |
| 2015/0281749 | A1 | 10/2015 | Hutchison et al. |
| 2016/0074724 | A1 | 3/2016 | Terre |
| 2016/0086315 | A1 * | 3/2016 | Bailey .......... G06T 5/005 348/164 |

FOREIGN PATENT DOCUMENTS

| | | |
|---|---|---|
| FR | 2661583 A1 | 10/1991 |
| GB | 2248742 B | 8/1992 |
| WO | 2012/170954 A2 | 12/2012 |

OTHER PUBLICATIONS

International Search Report and Written Opinion mailed Sep. 30, 2014 in Int'l Patent Application No. PCT/US2014/027610, 12 pages.
Notice of Allowance mailed Sep. 10, 2015 in U.S. Appl. No. 14/211,796, 11 pages.
U.S. Appl. No. 14/206,297, Non-Final Office Action mailed May 9, 2016, 7 pages.
U.S. Appl. No. 14/206,341, Non-Final Office Action mailed Jun. 2, 2016, 7 pages.

* cited by examiner

802

804

METHOD OF SHUTTERLESS NON-UNIFORMITY CORRECTION FOR INFRARED IMAGERS

CROSS-REFERENCES TO RELATED APPLICATIONS

This application is a divisional of U.S. patent application Ser. No. 14/211,796, filed Mar. 14, 2014, now U.S. Pat. No. 9,251,595 which claims priority to U.S. Provisional Patent Application No. 61/794,200, filed Mar. 15, 2013 entitled "METHOD OF SHUTTERLESS NON-UNIFORMITY CORRECTION FOR INFRARED IMAGERS," the disclosures of which are hereby incorporated by reference in their entirety for all purposes. This application is related to U.S. patent application Ser. No. 14/206,297, filed on Mar. 12, 2014, entitled "METHOD AND SYSTEMS FOR PRODUCING A TEMPERATURE MAP OF A SCENE," and U.S. patent application Ser. No. 14/206,341, filed on Mar. 12, 2014, entitled "METHOD AND SYSTEM FOR PROVIDING SCENE DATA IN A VIDEO STREAM," the disclosures of which are hereby incorporated by reference in their entirety for all purposes.

BACKGROUND OF THE INVENTION

The electromagnetic spectrum encompasses radiation from gamma rays, x-rays, ultra violet, a thin region of visible light, infrared, terahertz waves, microwaves, and radio waves, which are all related and differentiated in the length of their wave (wavelength). All objects, as a function of their temperatures, emit a certain amount of radiation. For example, the higher an object's temperature, the more infrared radiation is emitted.

Thermal cameras can detect this radiation in a way similar to the way a photographic camera detects visible light and captures it in a photograph. Because thermal cameras detect and capture infrared light, thermal cameras can work in complete darkness, as ambient light levels do not matter and are not needed. Color thermal cameras require a more complex construction to differentiate wavelength and color has less meaning outside of the normal visible spectrum because the differing wavelengths do not map uniformly into the system of color visible to and used by humans.

The monochromatic images from infrared cameras are often displayed in pseudo-color, where changes in color are used, as opposed to changes in intensity, to display changes in the signal, for example, gradients of temperature. This is useful because although humans have much greater dynamic range in intensity detection than color overall, the ability to see fine intensity differences in bright areas is fairly limited. Therefore, for use in temperature measurement, the brightest (warmest) parts of the image may be colored white, intermediate temperatures reds and yellows, transitioning to blues and greens, with the dimmest (coolest) parts black. Typically a scale may be shown next to a false color image to relate colors to temperatures.

Thermal cameras have many applications, particularly when light and visibility are low. For example, thermal cameras have been used in military applications to locate human beings or other warm entities. Warm-blooded animals can also be monitored using thermographic imaging, especially nocturnal animals. Firefighters use thermal imaging to see through smoke, find people, and localize hotspots of fires. With thermal imaging, power line maintenance technicians locate overheating joints and parts, a telltale sign of their failure, to eliminate potential hazards. Where thermal insulation becomes faulty, building construction technicians can see heat leaks to improve the efficiencies of cooling or heating air-conditioning. Thermal imaging cameras are also installed in some luxury cars to aid the driver at night. Cooled infrared cameras can be found at major astronomy research telescopes, even those that are not infrared telescopes.

SUMMARY OF THE INVENTION

According to the present invention, techniques related to a method of correcting non-uniformity in infrared (IR) images is provided. More particularly, embodiments of the present invention relate to methods for correcting the drift in an IR image based upon data observed in the image, without the use of a shutter, one of the industry standard techniques. The method may utilize factory calibrated tables, such as a gain table and an offset table. The method may further utilize a correction table, which may be iteratively updated. These methods can also assume that any pair of neighboring pixels view the same scene content (e.g., object) to compute the correction table at a local level, and when the assumption is violated, use an edge mask and motion detector to avoid correcting the affected pixels.

One issue generally suffered by thermal cameras is that of non-uniformity. That is, each detector (pixel) can have slightly different gain and offset across the array. Accurately compensating for this non-uniformity is necessary for high-quality thermal imaging. Further complicating this issue is the fact that the offsets in particular will change or drift with time.

According to a particular embodiment of the present invention, a method of correcting an infrared image is provided. The method includes providing a processor and receiving the infrared image from a thermal camera. The infrared image includes a plurality of pixels arranged in an input image array, a first pixel in the plurality of pixels having a first pixel value and one or more neighbor pixel with one or more neighbor pixel values. The first pixel and the one or more neighbor pixels are associated with an object in the image, the one or more neighbor pixels being adjacent to the first pixel in the input image array. The method also includes updating, by the processor, a correction array having a plurality of correction pixel values. The correction array is updated by, for each correction pixel value: determining the one or more neighbor correction pixel values for the correction value of the correction pixel array corresponding to the first pixel value of the input image array; computing a difference between a first correction value of the first pixel value and a neighbor correction value for each neighbor pixel value; determining that an absolute value of the difference is within a range; and determining the correction pixel value based on the difference. The method further includes providing an output image array based on the correction array and the input image array.

According to another embodiment of the invention, a sum of the first portion of the difference and the second portion of the difference can be equal to the difference. In another embodiment of the invention, updating the correction array can include adding the difference, or a fraction of the difference, or the first or second portion of the difference, to a previous neighbor correction value to update a neighbor correction value, and subtracting the difference (or another portion of the difference) from a previous correction value to update a correction value.

In another embodiment of the invention, the method can further include rather than determining that the first pixel value is not an edge, determining that the first pixel is an edge pixel, and assigning a mask to the first pixel.

According to another embodiment of the invention, providing the output image table can include summing corresponding pixel values from the input image array and the correction array.

In another particular embodiment of the invention, the image received from the camera may be a raw image, and the input image array can include multiplying the raw image by a gain array, wherein the gain array is a predetermined array of values. According to another embodiment of the invention, the input image array can further comprise adding an offset array, wherein the offset array is a predetermined array of values.

Numerous benefits are achieved by way of the present invention over conventional techniques. For example, embodiments of the present invention provide a local correction technique that may propagate over time to achieve uniformity of the entire array. These and other embodiments of the invention along with many of its advantages and features are described in more detail in conjunction with the text below and attached figures.

DETAILED DESCRIPTION OF THE INVENTION

Figure 1:
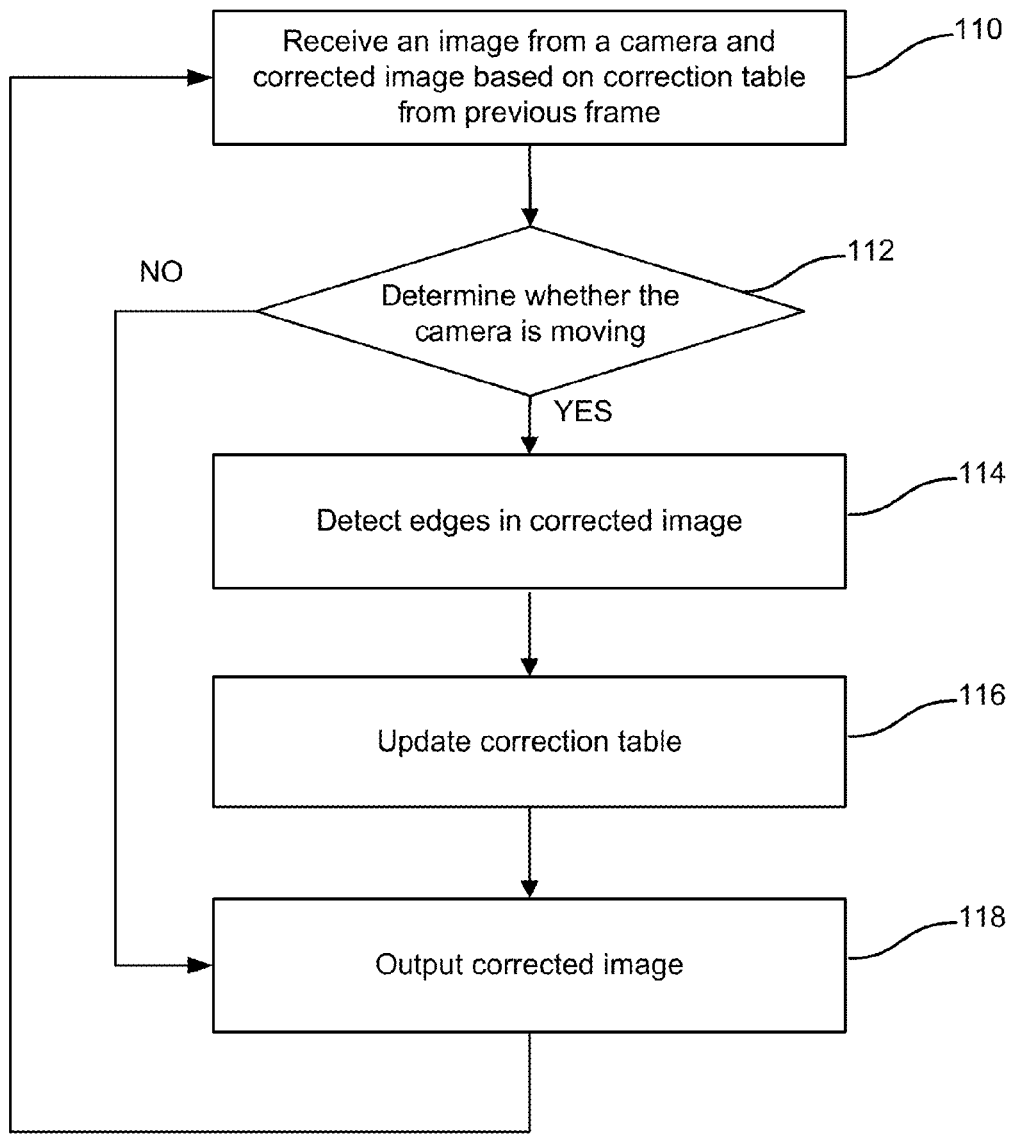
FIG. 1 is a simplified flowchart illustrating a method of correcting an infrared image according to an embodiment of the present invention.

Embodiments of the present invention provide a method of correcting non-uniformity in infrared (IR) images. The method can incorporate a correction table that, when added to the image, corrects the drift associated with each pixel.

Infrared imagers may be devices used to capture and/or form infrared images, for example, a thermographic camera or infrared camera. Infrared imagers may include any device that forms an image using infrared radiation. Instead of the 450-750 nanometer range of the visible light camera, infrared cameras may operate in wavelengths as long as 14,000 nm (14 µm).

Infrared energy is a part of the electromagnetic spectrum, which encompasses radiation from gamma rays, x-rays, ultra violet, a thin region of visible light, infrared, terahertz waves, microwaves, and radio waves. The various categories of infrared radiation are related and differentiated in the length of their wave (wavelength). All objects emit a certain amount of infrared radiation as a function of their temperature.

In general, objects with higher temperatures emit more infrared radiation as black-body radiation. Infrared imagers can detect this radiation in a way similar to the way an ordinary camera detects visible light. Infrared imagers have been used in various applications, particularly in applications with low light, such as in the nighttime, smoke-filled buildings, or underground. Accordingly, infrared imaging has useful applications in military, rescue, and wildlife observation operations, for example.

Color cameras require a more complex construction to differentiate wavelength and color has less meaning outside of the normal visible spectrum because the differing wavelengths do not map uniformly into the system of color vision visible and detectable to humans. Infrared image resolution and refresh rates are typically considerably lower than the resolution and refresh rates of visible cameras.

One existing issue with infrared imagers is that they are extremely susceptible to temperature variations of the device itself, which cause focal-plane array (FPA) drift; thus as the infrared imager device is being operated, the device itself generates heat during its operation, resulting in noise in an infrared image. For example, in uncooled detectors the temperature differences at the sensor pixels are minute; a 1° C. difference at the scene induces just a 0.03° C. difference at the sensor. Therefore, these sensors are particularly sensitive to noise. In addition, the pixel response time is also fairly slow, at the range of tens of milliseconds.

Therefore, to reduce the noise in infrared images, some infrared cameras are kept cooled, by containing them in a vacuum-sealed case or Dewar and cryogenically cooled. The cooling is necessary for the operation of the semiconductor materials in the sensors of the infrared imagers to reduce FPA drift, and the range of operating temperature may range depending on type and performance level.

Without cooling, these photo-detecting sensors which detect and convert infrared radiation would be 'blinded' or flooded by their own radiation, which results in FPA drift and noise in the thermal image. However, the drawbacks of cooled infrared cameras are that they are expensive both to produce and to operate at specific cooled temperatures, as the power consumption of cooling is high, costly, and time-intensive. For example, the thermal imager may need several minutes to cool down before it can begin operating properly. Additionally, even cooled sensors may experience some drift, but on a small scale than compared to the drift of a cooled sensor. However, embodiments of the present invention are applicable to both cooled and uncooled sensors. Further, drift is more a function of dark current than of being flooded by self radiation.

Alternatively, uncooled infrared imagers use a sensor operating at ambient temperature, or a sensor stabilized at a temperature close to ambient using small temperature control elements, which are more cost-effective to produce and operate. Modern uncooled detectors all use sensors that work by the change of resistance, voltage or current when heated by infrared radiation. These changes are then measured and compared to the values at the operating temperature of the sensor.

Uncooled infrared sensors can be stabilized to an operating temperature to reduce image noise, but they are not cooled to low temperatures and do not require bulky, expensive cryogenic coolers. This makes infrared cameras smaller and less costly. However, their resolution and image quality tend to be lower than cooled detectors. So the infrared imager, as it warms up or cools down, each pixel starts to react a little bit differently than it did at the initial temperature, consequently, each pixel begins drift in its performance. This drift, or FPA drift, typically appears as fixed patterns emerging in the image, for example, as a cross-hatched pattern, or as unwanted artifacts in the image. Typical methods of correcting FPA drift in infrared images was to either utilize factory calibration tables to help to correct the drift, and also implement a shutter operation in the infrared imager to generate an offset for the image. For example, take a picture of the uniform scene, or that shutter, and use that as an offset to correct the non-uniformity of the FPA drift of the pixels.

As described herein, embodiments relate to a shutter-less method of correcting non-uniformity in IR images. The method can determine if an image includes an edge. "Edges" occur around the outline of objects in the image and manifest within the image as a difference in pixel value between a pixel and one or more of its neighbors (e.g., above, below, left, right, or diagonal, etc.). A small difference in pixel value can be indicative of a weak edge and a large difference in pixel value can be indicative of a strong edge. The method may initially assume that each pixel and its immediate neighbors are viewing the same scene content (e.g., object) in an image, and thus should read the same pixel value. In an embodiment, an edge can cause these and other assumptions to be untrue, including the assumption that each pixel and its immediate neighbors are viewing the same object in a scene. In an embodiment of the invention, a pixel showing an edge may not be processed (e.g., skipped).

When neighboring pixels do not read the same value, it can also be due to drift of the focal plane array (FPA) from the factory calibrated non-uniformity correction (NUC) tables.

In an embodiment, a correction table can be incorporated with the method to correct the drift. The correction table may be the same size as the image so that each entry (e.g., cell) in the table can store the correction value for the corresponding pixel in the image. Other tables, such as a gain or an offset table, may also be used to iteratively form a correction table. The gain and offset tables may be factory tables with predetermined settings.

An offset table may be a matrix that is also the same size of the image such that each entry in this table corresponds to one of the pixels in the image. The offset table may be automatically adjusted to remove non-uniformities from the infrared imager. Gain and offset tables may be factory calibration tables, which may be used in embodiments of the present invention without the use of the shutter to capture a uniform image. Embodiments of the invention describe an automatic algorithm to replace the shutter using the factory calibration tables for gain and offset, as well as a correction table.

Although some embodiments of the present invention utilize gain and offset arrays in conjunction with a linear NUC model, these arrays and their use are not required by the present invention. The present invention is not dependent upon the implementation of a linear NUC model. On the contrary, embodiments of the present invention can be implemented using other types of NUC models. Accordingly, embodiments create a table C such that an output=f (raw image)+C is an image with fixed pattern noise corrected, where f( ) represents a correction of the raw image according to tables previously measured (e.g., in a factory during manufacturing). These tables have coefficients for each pixel that are useful in any NUC model, be that linear or otherwise. One of ordinary skill in the art would recognize many variations, modifications, and alternatives.

The method may begin by forming the correction table. Each pixel can be analyzed by comparing the pixel to each of its neighbors. Any number of neighbors may be used. For example in the case of four neighbors, if $I(x,y)$ represents the image pixel at column "x" and row "y," then when $I(x,y)$ is processed, $I(x+1,y)$, $I(x-1,y)$, $I(x,y+1)$, and $I(x,y-1)$ are the neighbors.

The pixel analysis for the correction table can occur in any order. For example, the analysis can begin by processing the pixel on the first row and first column of the image and proceed along the columns of the first row. When all columns of that row are finished, processing can move to the next row, starting at the first column. Processing can continue to each row until each pixel in the image has been processed.

The correction table can alter the correction value for a variety of situations, including when the pixel is part of an edge region. If the method is allowed to operate on an edge, the edge can become blurry as the algorithm seeks to make the pixels around the edge read the same value.

Edge regions can be detected during processing by implementing an edge detection algorithm. Correction table entries corresponding to the detected edge pixels can be prohibited from being updated (e.g., they are "masked out" of the updating process) in order to avoid a deleterious blurring effect. Any edge detection algorithm may be used (e.g., the Canny algorithm that can detect weak as well as strong edges).

In an embodiment, a motion detection algorithm can also be used when forming the correction table. Since the edge detection method cannot detect some weak edges (e.g., locations in the image where only a small difference in pixel value exists between a given pixel and its neighbor due to the scene), a motion detection algorithm can be used. The motion detection algorithm can prohibit the correction table from being updated while the scene is stationary. This can prevent "burn in," which is a condition where, in some embodiments, the correction factor erroneously takes scene differences as pixel offset differences. The motion detection algorithm may be accomplished with the use of motion sensors mounted to the camera or may be accomplished with image processing techniques.

To begin processing the current frame, each pixel at column "x" and row "y" may be initially corrected with the factory tables (e.g., in the case of a linear non-uniformity model): $I(x,y)=g(x,y)P(x,y)+O(x,y)$, where $g(x,y)$ is the corresponding entry in the factory-determined gain table, $P(x,y)$ is the pixel value at column "x" and row "y" in the raw observed image, and $O(x,y)$ is the corresponding entry in the factory-determined offset table. The pixels may be further modified by adding the corresponding entry in the correction table from the previous frame $C(x,y)$: $I'(x,y)=I(x,y)+C(x,y)$, where $I'(x,y)$ is the initially corrected pixel value at column "x" and row "y." In an embodiment, the correction table, $C(x,y)$, can be initialized to all zeros when the camera is turned on or can be initialized to some other predetermined array. If the camera is determined to not be moving, I'(x,y) is output and no update is made to the correction table on the current frame. If the camera is determined to be moving, the initially corrected image I'(x,y) is input to the edge detection algorithm.

Once the edges have been detected, updating of the correction table C(x,y) for the current frame may proceed. Processing the $x^{th}$ column and the $y^{th}$ row of table C can proceed by first determining if the pixel I(x,y) is an edge pixel. If it is an edge pixel, no processing may be done and the algorithm can move on to the next pixel. If it is not an edge pixel, the algorithm can compute an update to table C.

To update table C, the algorithm can then proceed entry by entry in the previously mentioned order by computing the difference ("DIFF") between the corrected pixel and the corrected value of its first neighbor, if the neighbor is not an edge pixel. For example, if the neighbor is I(x+1,y), then: DIFF=(I(x,y)+C(x,y))−(I(x+1,y)+C(x+1,y)). If the neighbor is an edge pixel, that neighbor can be ignored.

A portion of "DIFF" can be subtracted from the pixel's corresponding entry in the correction table C(x,y), and the same portion can be added to the neighbor's corresponding entry in the correction table C(x+1,y). This process can be repeated for each neighbor. In an embodiment, the algorithm may be altered to adjust the proportion of the difference that is added and subtracted from the entries in the correction table.

After all neighbors have been analyzed, processing can proceed to the next pixel. In an embodiment, the processing can recursively analyze each pixel in the received image.

After the correction table has been updated, the updated correction table can be added to the NUC-corrected image, using the following formula: Output(x,y)=I(x,y)+C(x,y).

In one embodiment of the invention, a method of updating the correction table with edge detection is provided which may be used with camera motion and is thus, a motion-based method with edge detection. This motion-based method for updating the correction table includes prior edge detection. Further, in this motion-based method with edge detection, the DIFF is divided by a denominator, in conjunction with the camera motion detected prevents over-reacting and over-compensation in detecting weak scene edges and/or temporal noise.

In another embodiment of the invention, a method of updating the correction table without edge detection is provided which may be used with or without camera motion. Thus, this method may be motionless or motion-based in updating the correction table; however, this method does not utilize prior edge detection. In this method of updating the correction table without edge detection, it may be determined whether the DIFF falls within a range designated by threshold values T1 and T2, which may be set to accommodate a moving camera or a non-moving camera. For example, T1 may be set to a larger value for a moving camera compared to a non-moving camera, and T2 may be set to a smaller value for a moving camera compared to a non-moving camera.

FIG. 1 is a simplified flowchart illustrating a method of correcting an infrared image according to an embodiment of the present invention. The method includes receiving a raw image from a camera at 110. The image can comprise a first pixel with a first pixel value and a neighbor pixel with a neighbor pixel value, wherein the first pixel and the neighbor pixel are assumed to view the same object in the image. The raw image may be processed using the factory calibration tables for gain and offset to generate a processed image. The raw image may also be processed with a correction table from the previous frame. Thus, for example, if the camera is receiving the first frame, then the values in the initial correction table may be zero or another initial pre-determined value, since there is no previous frame to begin calculating a correction table from; in this case.

At 112, the method further includes determining whether the camera (e.g., infrared imager) is moving. When the camera is determined to be moving, the method further includes detecting the edges in the corrected image at 114 by iterating through each pixel in the corrected image. Then at 116, the correction table is updated and a corrected image is generated with the updated correction table. The corrected image may be generated by adding the first pixel value to its corresponding corrected pixel value in the updated correction table. The correction table may be updated, for example, by iterating through each pixel, computing the difference between the first image pixel and the neighbor pixel value, subtracting the difference from the first image pixel, and adding the difference to the neighbor pixel value.

Once the correction table is updated, the method includes outputting a corrected image at 118. The corrected image is the processed image corrected by the values in the updated correction table updated in 116, which may be achieved by summing corresponding pixel values from the processed image and the correction table. The method then proceeds to receive and process the next raw image at 110, and the previously updated correction table is used for the next frame. When at 112, the camera is determined to not be moving, in an embodiment, the method may directly output the corrected image at 118 with the previous correction table.

It should be appreciated that the specific steps illustrated in FIG. 1 provide a particular method of correcting an infrared image according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
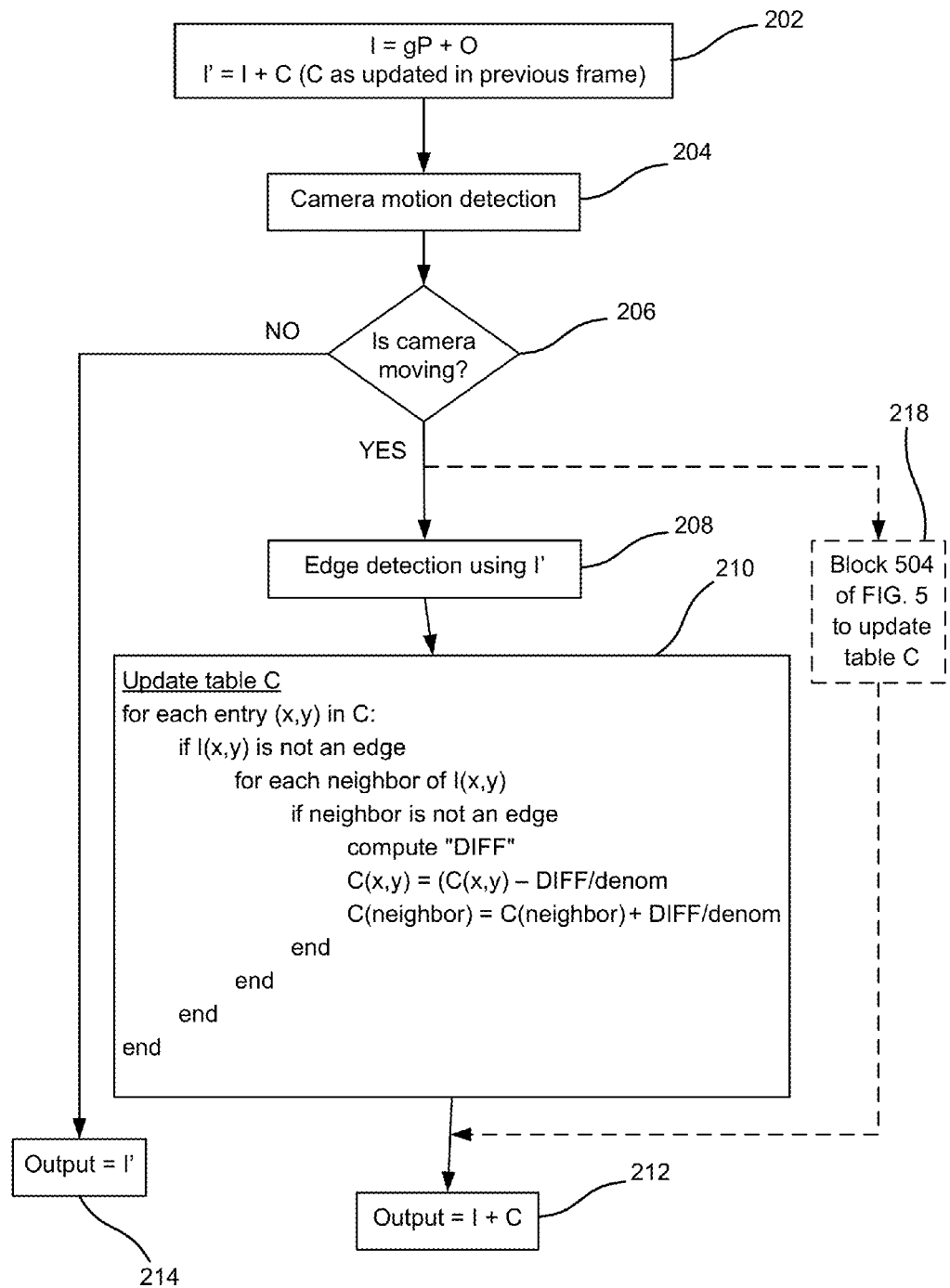
FIG. 2 is a simplified flowchart illustrating a method of correcting an infrared image using edge detection according to an embodiment of the present invention.

FIG. 2 is a simplified flowchart illustrating a method of correcting an infrared image according to an embodiment of the present invention. At 202, a processed image "I" may be generated based on a received raw image "P". Raw image P is processed with a factory calibration table "g" (hereinafter, referred to as "the gain table"), which is the same size as the raw image P. Accordingly, each value in the gain table g is a gain value for a corresponding pixel value in image P. Since P is the raw image captured by the camera, the pixels in P have non-uniformities. "O" is a factory calibrated table for offset (hereinafter, referred to as "the offset table"). As shown in 202, I is a processed image of raw image P using the gain table g and the offset table O, both of which are factory calibrated tables. Accordingly, the processed image I is the gain table g multiplied by the raw image P, plus the offset table O, (I=gP+O) which results in some corrections to the non-uniformities of raw image P, but is not ideal.

It should be noted that I=gP+O is a linear model for NUC that may be used and is described in the embodiment of FIG. 2. However, other NUC models may be utilized, for example, quadratic models may be implemented in other embodiments of the invention.

To improve the corrections to the non-uniformities of raw image P, a correction table "C" may be further added. In addition to processed image I, there may also be a corrected image "I'" generated, which is the processed image summed with the correction table (I'=I+C). Similar to g and O, C is a table of the same size as P, however C is not a static factory calibrated table, but a dynamically generated correction table. According to embodiments in the invention, C is populated iteratively to automatically correct I and remove all remaining non-uniformities that exist after the use of factory calibrated tabled g and O. Thus initially at the first frame to be processed in 202, C may be set to have values of zero or another pre-determined value, and when the next frame is processed, the C used to correct the second frame is updated and calculated based on the first (or previous) frame. Accordingly, C is constantly and iteratively updated sequentially with each frame.

At 204, a camera motion detection is performed, which may be accomplished using a motion sensor, or using image processing-based techniques to determine whether the camera is moving. At 206, if the camera is not moving, then at 214, the output image generated is I', which is the processed image I summed with C from the previous frame. If at 206, the camera is determined to be moving, then at 208, an edge detection is performed using I', which is the corrected image using C as generated from the last frame.

The edge detection at 208 is performed using the best data currently available for that frame, which is I'. Therefore the pixels in I' are analyzed to determine a list of the edge pixels. An edge of the image would be, for example, in a scene including a hot ball against a cold background, the edges would just be the outline of that ball. The edge detection in 208 would result in a list of the pixels that define the outline of the ball. However, it may not be simple to determine all of the edges in the image. Strong edges, for example, such as the ball against a white background, may be easy to determine. However weak edges, such as the hot ball in a shadow or against a background in a similar temperature as the ball, may be more difficult to discern as the edge pixels may start to get lost in the noise of the image. Various edge detection algorithms and techniques may be implemented. In an embodiment of the invention, the edge detection of 208 determines strong edges and provides a list of edge pixels that define strong edges in the image.

At 210, the correction values in C may be updated based on the non-edge pixels of I. As shown in 210, an example of the pseudo-code to update C is shown in nested loops. For each entry (pixel) at x,y of C, it is determined whether that entry (x,y) in I is an edge. If I(x,y) is an edge, then that entry (e.g., pixel) is skipped and the next entry in C and its corresponding entry in I is evaluated. The next entry evaluated in a table, such as C, g, P, I, and I', may be determined by scanning in raster scan mode. For example, evaluating all the x values in row y, for example: (x,y), (x+1,y), (x+2,y) . . . (x+n,y), and then proceeding to the next row, y+1, for example: (x, y+1), (x+1,y+1), (x+2,y+1) . . . (x+n,y+1). The elements of correction table C may be evaluated in any order.

If in 210, I(x,y) is not an edge, then the neighbors of that pixel are evaluated. Neighbors may include the pixels directly above, directly below, directly to the left, and directly to the right. Neighbors may also include pixels that are diagonal—northwest, northeast, southwest, southeast to I(x,y), or any combination of surrounding pixels to I(x,y).

The neighboring pixels are then evaluated to determine if the neighboring pixels are edges or not. If the neighbor pixel is not an edge, then the difference "DIFF" is computed, which may be the difference between the corrected pixel and the corrected value of its first neighbor. For example, if the neighbor is I(x+1,y), then: DIFF=(I(x,y)+C(x,y))−(I(x+1, y)+C(x+1,y)). Reducing the equation, the DIFF is essentially the best correction of the current pixel minus the best correction of the neighbor. If the neighbor is an edge pixel, that neighbor can be ignored.

If the neighbor is not an edge, then ideally, the neighbor and the current pixel I(x,y) should be equal, and DIFF represents the extent to which the neighbor and the current pixel are not equal. However, DIFF includes pixel differences due not only to the fixed pattern noise from pixel drift but also from other causes such as temporal noise and weak edges from the scene that did not get masked. Therefore the correction value for I(x,y) is determined by using a portion of DIFF so that over several frames, the difference between the pixels will converge to zero and make the non-edge neighbor and the non-edge current pixel I(x,y) equal without reacting too strongly to temporal noise or weak edges. As shown in 210, the correction values for I(x,y) and I(neighbor) are updated in correction table C. To update the correction values in C, a portion of DIFF may be subtracted from the current value of C(x,y), which is the correction value of I(x,y), and added to the current correction value of the neighbor pixel, which is C(neighbor). Every pixel in I and its corresponding entry in C is evaluated to iteratively update all the correction values in every entry in C.

Masking of scene edges found via edge detection is performed to avoid processing edge pixels because the correction values are computed to minimize the difference between a current pixel and its neighbor. If the neighbor is an edge and the current pixel is not, then minimizing the difference would "burn" the edge into table C. This would have the effect of blurring the edge until the camera moves and it would have the effect of a ghost edge in that location of the image after the camera moves. However, edge detection algorithms cannot be counted on to find all edges, particularly weak edges. Therefore, the updates to C are only allowed when the camera is moving. Because, if for example, in comparing the pixel to its neighbor it happens to be on a weak edge that is not masked out, the correction values will get updated to minimize the difference across this edge. However, since the update is only allowed if the camera is moving, and since only a portion of DIFF is used to update table C, the correction that was erroneously computed because of that weak edge will be imperceptibly small and will only be used once because a weak edge in one frame will be positioned on different pixels on the next frame when the camera is moving.

When the camera is not moving, no update to table C is made and I' (the image corrected by the last frame's correction table) is output in one embodiment. Not updating table C in this case keeps unmasked weak edges from being burned into table C. The edge detection in 208 may be used when the camera is moving because weak edges may be difficult to detect. Therefore, if the camera is stationary, and if a pixel and its neighbor, on a current frame form a weak edge, the iterative correction table updated in 210 of FIG. 2 may result in a blurring of the edge after the processing of several frames.

Thus, in an embodiment, when camera motion is detected in 206, a method of updating table C with edge detection is performed in 208 and 210.

Alternatively, in another embodiment, when camera movement is detected in 206, then in 218, a method of updating table C without edge detection may be utilized. This method of updating table C in 218 is shown in block 504 of FIG. 5. Referring to 504 of FIG. 5, without edge detection, every entry in C and every pixel in I is evaluated at 504. For each correction value (x,y) in C, and for each neighbor of (x,y) in C, a difference DIFF 15 computed. As mentioned previously, every correction value in C corresponds to a pixel in I, for example correction value C(x,y) corresponds to pixel I(x,y), and correction value C(neighbor) corresponds to pixel I(neighbor).

The DIFF may be computed by taking the difference between I(x,y)+C(x,y) and I(neighbor)+C(neighbor). If the absolute value of DIFF is within a range of values as defined by thresholds T1 and T2, then the correction value is updated. For example, whether T1>absolute value of DIFF>T2. Thresholds T1 and T2 may be predetermined values. The correction value C(x,y) for the current pixel is updated by subtracting a fraction of the DIFF from the current correction value. The fraction of the DIFF may be computed by dividing DIFF by a denominator, denom. The denominator denom, T1, and T2 may be input values that are set, and/or may be predetermined. The correction value of the neighbor C(neighbor) may be updated by adding the fraction of the DIFF (for example, DIFF/denom) to the current correction value of the neighbor. 504 is repeated iteratively for every entry in C, until the entire table is populated and updated.

For this moving camera case, T1 may be chosen to be a value such that the amount DIFF/denom is imperceptible to the eye when the pixel differences (DIFF) is less than T1. T2 may be chosen to be smaller than T1 such that pixel differences less than T2 are so small as to not be worth correcting. T2 may provide a lower limit on pixel differences in order to prevent over-convergence of the algorithm.

Referring to FIG. 2, at 212, after every entry in I and C have been iterated through by either a combination of 208 and 210 (method of updating table C with edge detection), or by 218 only (method of updating table C without edge detection), then the outputted image is a summation of the processed image I (in which I=gP+O) and the updated correction table C. As a result, the outputted image contains a more complete correction of the non-uniformities of the raw image, with the correction becoming progressively and iteratively improved.

It should be appreciated that the specific steps illustrated in FIG. 2 provide a particular method of correcting an infrared image according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
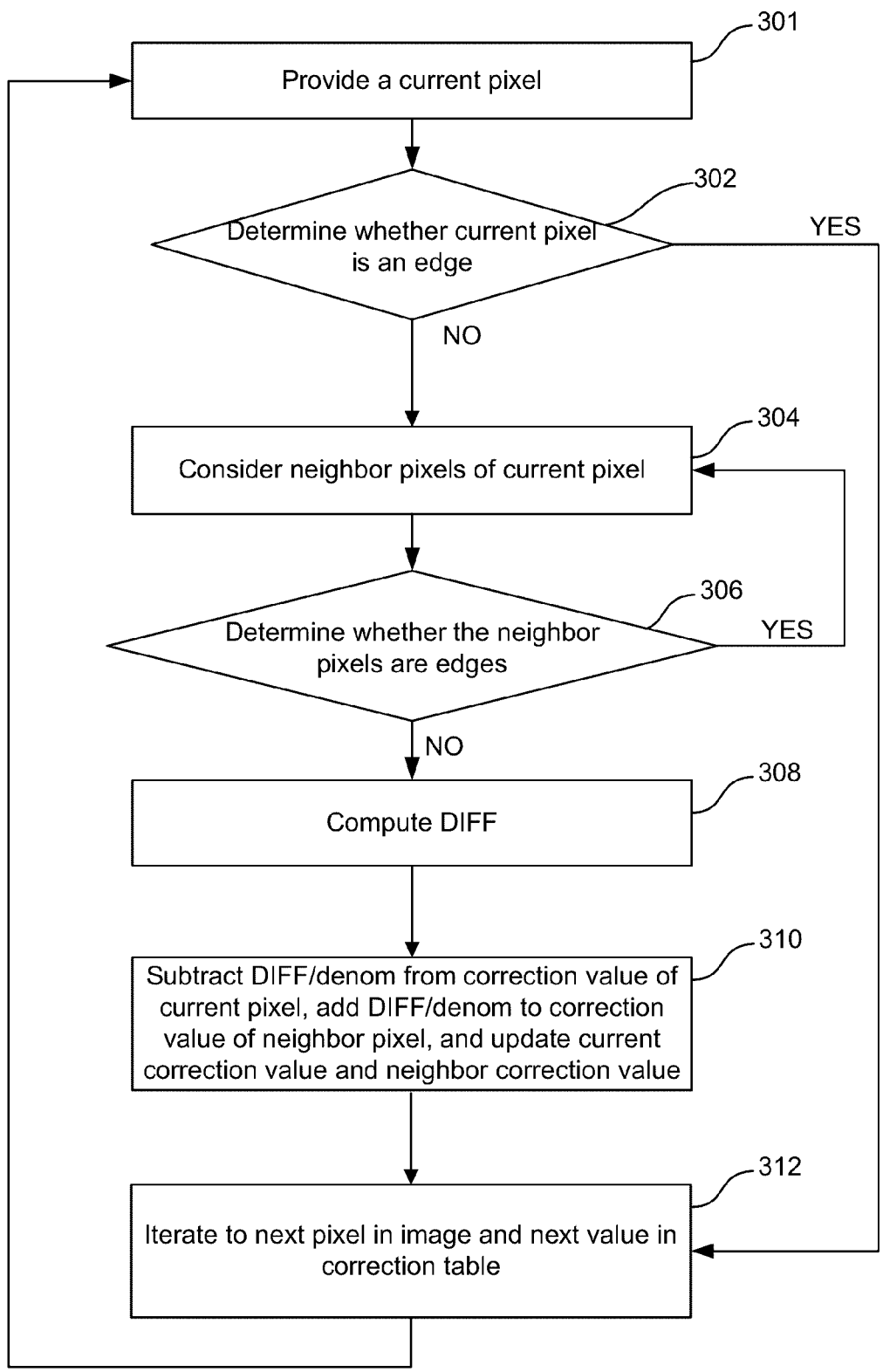
FIG. 3 is a simplified flowchart illustrating a method of updating the correction table using edge detection according to an embodiment of the present invention.

FIG. 3 is a simplified flowchart diagram illustrating a method of updating a correction table with edge detection according to an embodiment of the present invention, for example, as shown in 210 of FIG. 2. At 301, a current pixel is provided. Evaluating the current pixel I(x,y), at 302, the method further includes determining whether the current pixel I(x,y) is an edge. If the current pixel is determined to be an edge at 302, then the method proceeds to 312 and iterates to a next pixel in the image and a next value in the correction table. If I(x,y) is not an edge, then the neighbors of that pixel are determined and considered at 304. Neighbors may include any surrounding pixels to I(x,y).

At 306, the neighboring pixels are then evaluated to determine if the neighboring pixels are edges or not. If the neighbor pixel is determined to be an edge at 306, then the method reverts back to 304 to consider another neighbor pixel of the current pixel I(x,y) until all the neighboring pixels have been considered. If the neighbor pixel is not an edge, then the difference "DIFF" between the corrected pixel and the corrected value of its first neighbor is computed at 308. For example, if the neighbor is I(x+1,y), then: DIFF= (I(x,y)+C(x,y))−(I(x+1,y)+C(x+1,y)). If the neighbor is an edge pixel, that neighbor can be ignored.

When the neighbor is not an edge, then DIFF quantifies how different the neighbor and the current pixel I(x,y) are, and the correction value for the current pixel is calculated to minimize DIFF such that is converges close to zero. When DIFF converges, then the current pixel and the neighbor should be almost equal. In 310, the updated correction values in C are computed by subtracting DIFF/denom from the current value of C(x,y), which is the correction value for I(x,y), and adding DIFF/denom to the current correction value of the neighbor pixel, which is C(neighbor). The value of denom may be a predetermined value.

At 312, the method includes proceeding to the next pixel in image I and its corresponding correction value in correction table C. The method may then proceed to evaluate the next pixel as the current pixel provided in 301. The process shown in 301-312 is repeated for every pixel in I(x,y) to iteratively, automatically, and incrementally update the correction values in correction table C.

It should be appreciated that the specific steps illustrated in FIG. 3 provide a particular method of updating a correction table according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4A:
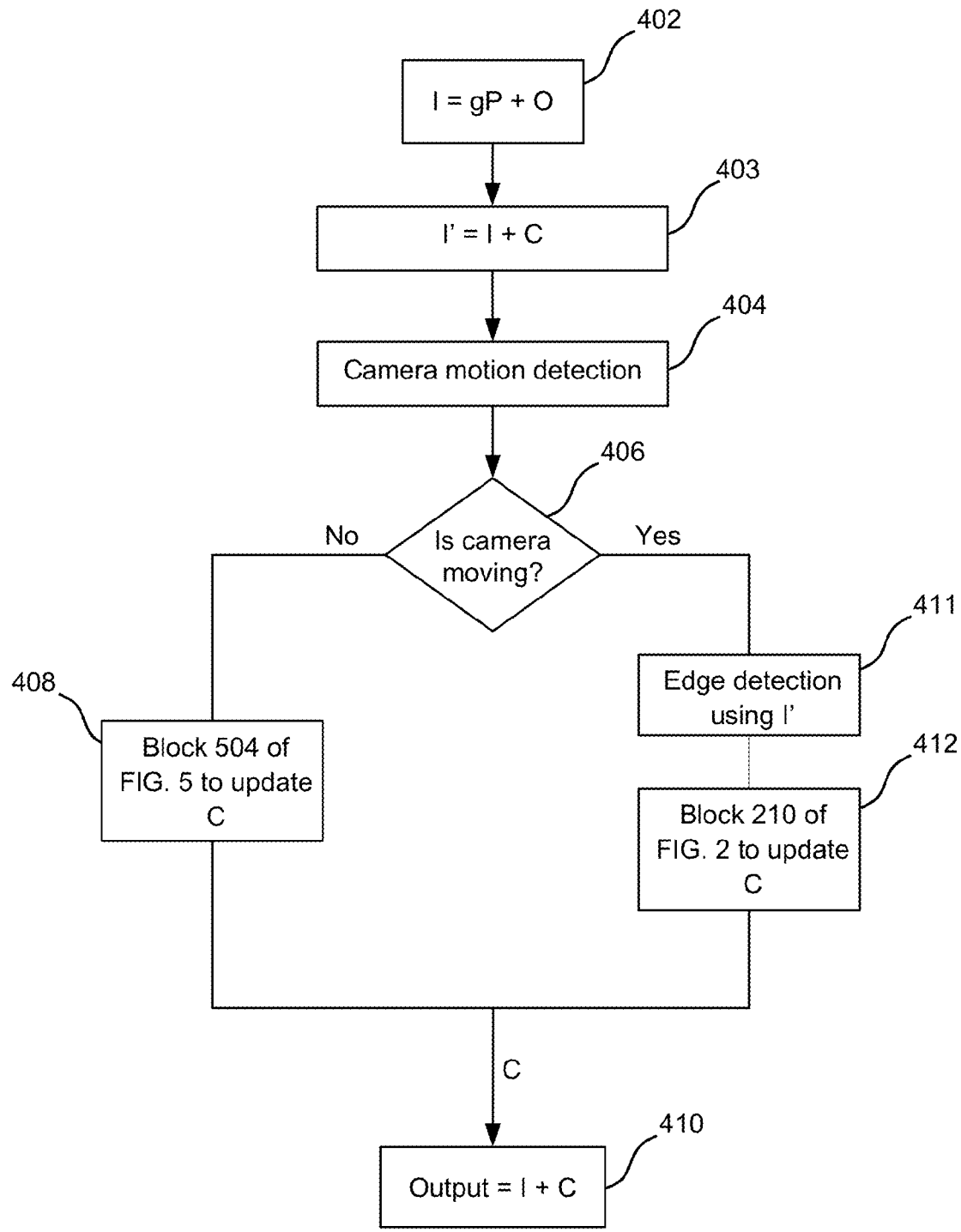
FIG. 4(a) is a simplified flowchart illustrating a method of correcting an infrared image by updating a correction table with and without edge detection according to another embodiment of the present invention.

FIG. 4(a) is a simplified flowchart illustrating a method of correcting an infrared image according to another embodiment of the present invention.

At 402, a processed image I may be generated by multiplying a raw image P with a factory calibrated gain table g with an added factory calibrated offset table O, such that I=gP+O. As a result, I contains some corrections to the non-uniformities of raw image P, but is not ideal, as the corrections are based purely on factory calibrated tables with predetermined values. In addition to processed image I, there may also be a corrected image "I'" generated at 402, which is the processed image summed with the correction table (I'=I+C). Similar to g and O, C is a table of the same size as P, however C is not a static factory calibrated table, but a dynamically generated correction table. According to embodiments in the invention, C is populated iteratively to automatically correct I and remove all remaining non-uniformities that exist after the use of factory calibrated tabled g and O. Thus initially at the first frame to be processed in 402, C may be set to have values of zero or another pre-determined value, and when the next frame is processed, the C used to correct the second frame is updated and calculated based on the first (or previous) frame.

At 404, a camera motion detection operation is performed. Detecting camera motion may be accomplished using a motion sensor, or using image processing-based techniques. At 406, if the camera is moving, then edge detection using I' is performed at 411, and a correction table is generated, populated, and updated at 412, using the method illustrated in FIG. 3 and at 210 of FIG. 2. The edge detection at 411 may be performed using the best data currently available for that frame, which is I'. Therefore the pixels in I' are analyzed to determine a list of the edge pixels. Various edge detection algorithms and techniques may be implemented at 411. In an embodiment of the invention, the edge detection of 411 may provide a list of edge pixels that define strong edges in the image.

Figure 5:
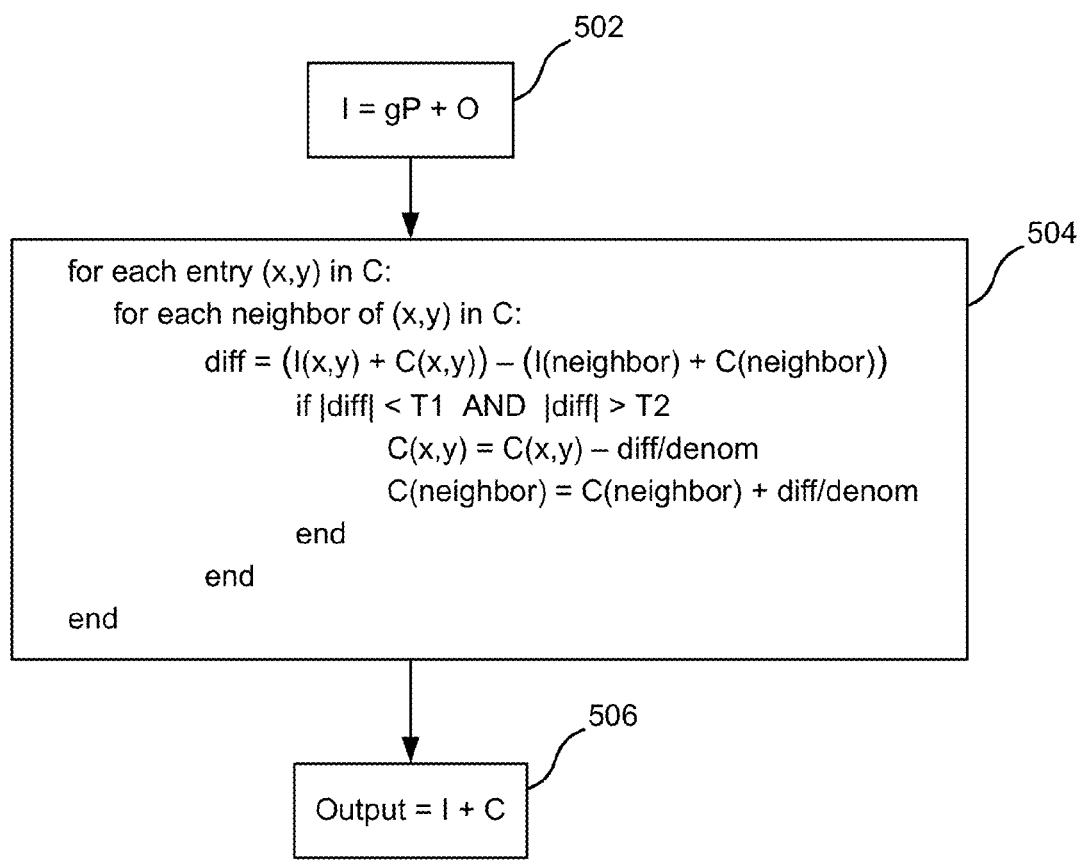
FIG. 5 is a simplified flowchart illustrating a method of updating the correction table without edge detection according to an embodiment of the present invention.
Figure 6:
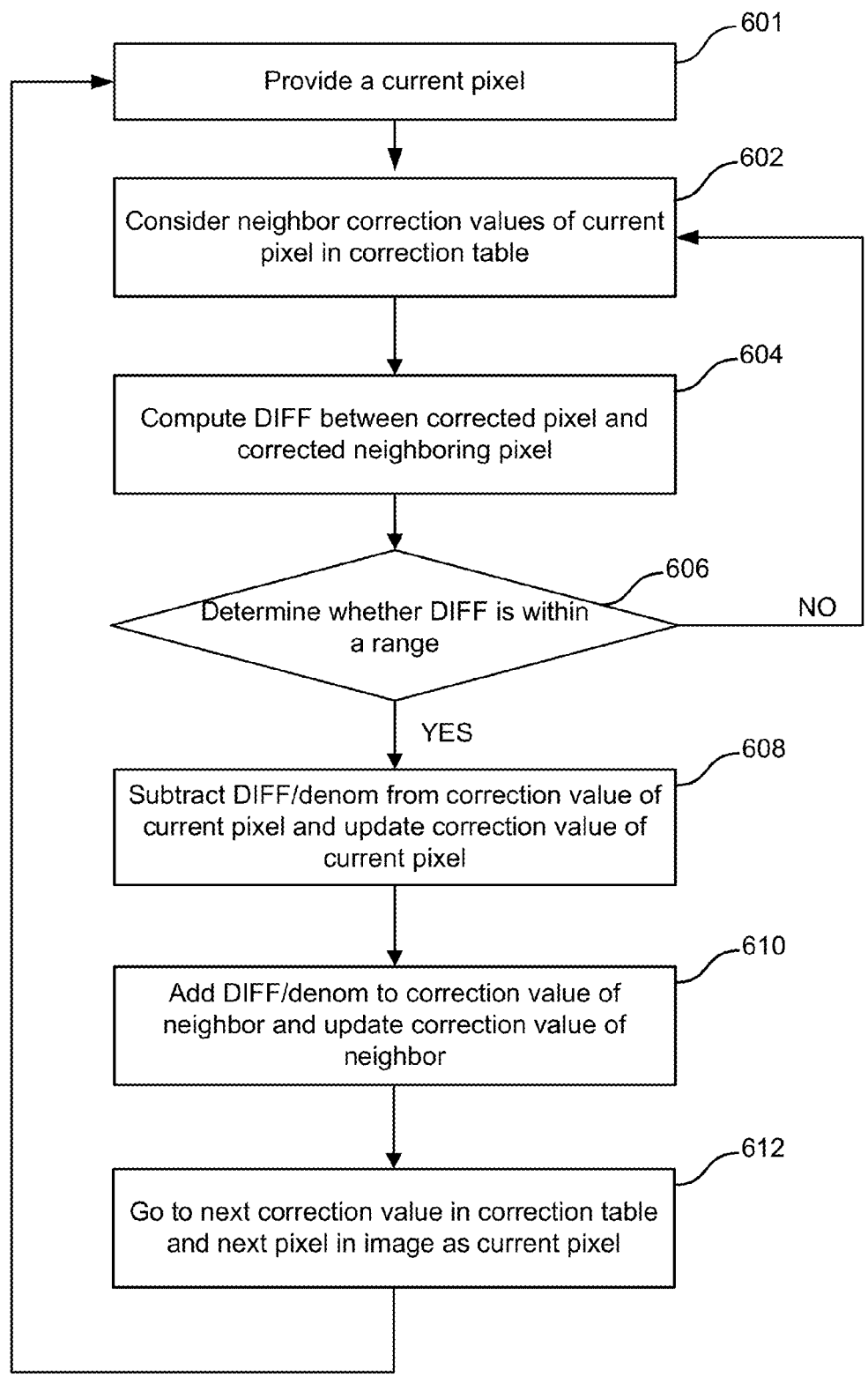
FIG. 6 is a simplified flowchart illustrating a method of updating the correction table without edge detection according to an embodiment of the present invention.

However, if at 406, the camera is not moving, then a correction table is generated, populated, and updated at 408 according to a method illustrated in FIG. 6 and at 504 in FIG. 5. Referring to 504 of FIG. 5, without edge detection, every entry in C and every pixel in I. For each correction value (x,y) in C, and for each neighbor of (x,y) in C, a difference DIFF 15 computed. As mentioned previously, every correction value in C corresponds to a pixel in I, for example correction value C(x,y) corresponds to pixel I(x,y), and correction value C(neighbor) corresponds to pixel I(neighbor).

The DIFF may be computed by taking the difference between I(x,y)+C(x,y) and I(neighbor)+C(neighbor). If the absolute value of DIFF is within a range of values as defined by thresholds T1 and T2, then the correction value is updated. For example, whether T1>absolute value of DIFF>T2. Thresholds T1 and T2 may be predetermined values. The correction value C(x,y) for the current pixel is updated by subtracting a fraction of the DIFF from the current correction value. The fraction of the DIFF may be computed by dividing DIFF by a denominator, denom. The denominator denom, T1, and T2 may be input values that are set, and/or may be predetermined. The correction value of the neighbor C(neighbor) may be updated by adding the fraction of the DIFF (for example, DIFF/denom) to the current correction value of the neighbor. 504 is repeated iteratively for every entry in C, until the entire table is populated and updated.

In this non-moving camera case, T1 may be chosen to be a value such that pixel differences less than T1 are imperceptible to the eye. T2 may be chosen to be smaller than T1 such that pixel differences less than T2 are so small as to not be worth correcting. T2 may provide a lower limit on pixel differences in order to prevent over-convergence of the algorithm.

Referring back to FIG. 4(*a*), when the correction table C is complete from either 408 or 412, it is added to processed image I (I=gP+O) to create an output image that is corrected of its non-uniformities without edge detection.

Figure 4B:
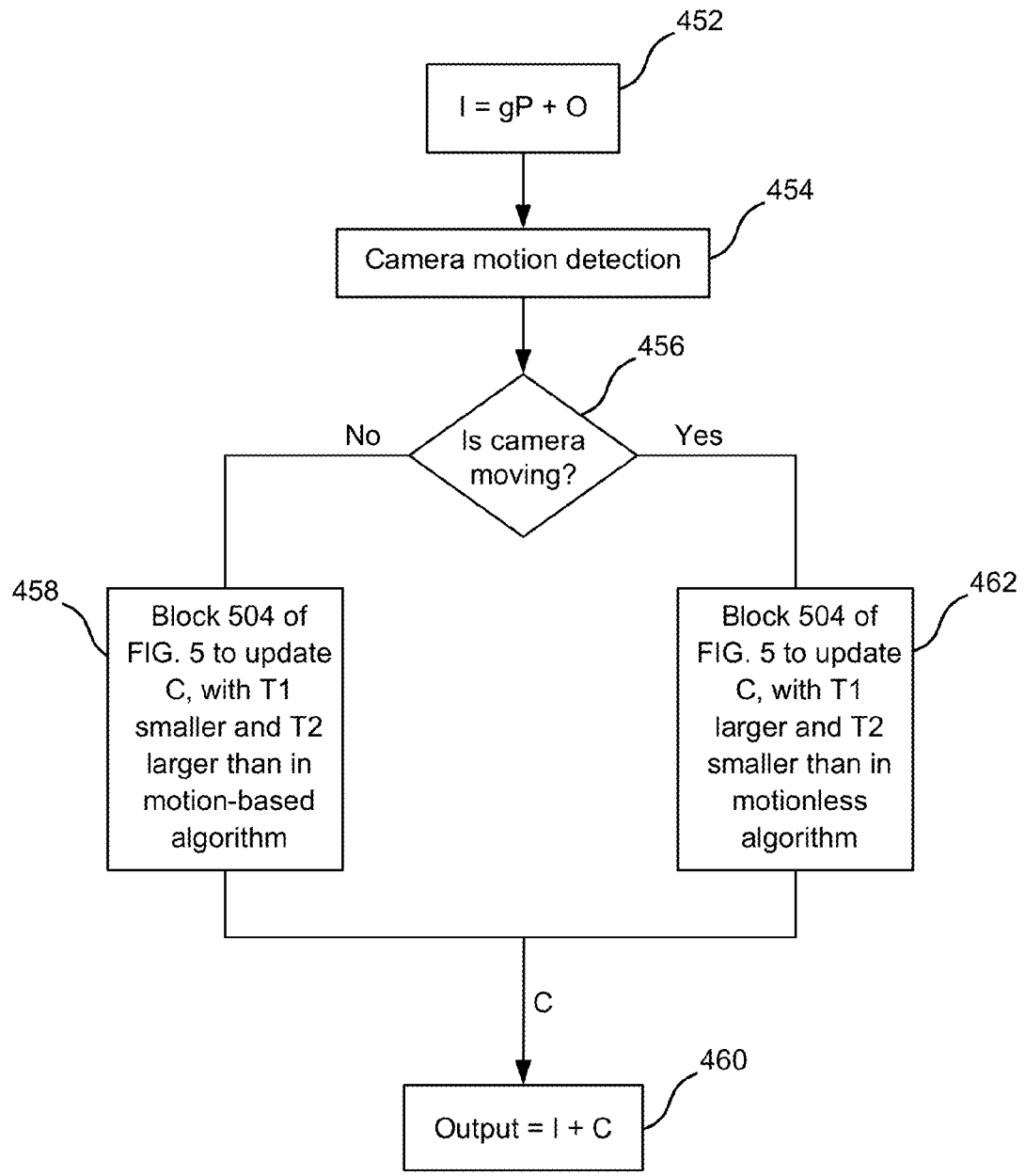
FIG. 4(b) is a simplified flowchart illustrating a method of correcting an infrared image by updating a correction table without edge detection according to another embodiment of the present invention.

It should be appreciated that the specific steps illustrated in FIG. 4(*a*) provide a particular method of correcting an infrared image according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4(*b*) is a simplified flowchart illustrating a method of correcting an infrared image according to another embodiment of the present invention without edge detection for both motionless and motion-based algorithms for updating the correction table.

At 452, a processed image I may be generated by multiplying a raw image P with a factory calibrated gain table g with an added factory calibrated offset table O, such that I=gP+O.

At 454, a camera motion detection operation is performed. Detecting camera motion may be accomplished using a motion sensor, or using image processing-based techniques. At 456, if the camera is moving, then a correction table is generated, populated, and updated at 462 according to a method illustrated in FIG. 6 and at 504 in FIG. 5, where T1 is larger and T2 is smaller than in a motionless algorithm of 458. Referring to 504 of FIG. 5, without edge detection, every entry in C and every pixel in I is evaluated. For each correction value (x,y) in C, and for each neighbor of (x,y) in C, a difference DIFF is computed.

The DIFF may be computed by taking the difference between I(x,y)+C(x,y) and I(neighbor)+C(neighbor). If the absolute value of DIFF is within a range of values as defined by thresholds T1 and T2, then the correction value is updated. For example, whether T1>absolute value of DIFF>T2. Thresholds T1 and T2 may be predetermined values. The correction value C(x,y) for the current pixel is updated by subtracting a fraction of the DIFF from the current correction value. The fraction of the DIFF may be computed by dividing DIFF by a denominator, denom. The denominator denom, T1, and T2 may be input values that are set, and/or may be predetermined. The correction value of the neighbor C(neighbor) may be updated by adding the fraction of the DIFF (for example, DIFF/denom) to the current correction value of the neighbor. 504 is repeated iteratively for every entry in C, until the entire table is populated and updated.

For this moving camera case, T1 may be chosen to be a value such that the amount DIFF/denom is imperceptible to the eye when the pixel differences (DIFF) is less than T1. T2 may be chosen to be smaller than T1 such that pixel differences less than T2 are so small as to not be worth correcting. T2 may provide a lower limit on pixel differences in order to prevent over-convergence of the algorithm.

Referring back to FIG. 4(*b*), when the camera is determined to not be moving in 456, then the method proceeds to the motionless algorithm of 458, according to a method illustrated in FIG. 6 and block 504 of FIG. 5, where T1 is smaller and T2 is larger than in the motion-based algorithm of 462. Thus, embodiments of the present invention provide a method of performing NUC in situations when the camera is not moving (i.e., still camera case) by making updates to the correction table when the camera is still using block 458 of FIG. 4.

At 460, when the correction table C is complete from either 458 or 462, it is added to processed image I (I=gP+O) to create an output image that is corrected of its non-uniformities without edge detection.

It should be appreciated that the specific steps illustrated in FIG. 4(*b*) provide a particular method of correcting an infrared image according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 5 illustrates a simplified flowchart illustrating a method of updating a correction table without camera movement according to an embodiment of the invention. At 502, a processed image I=gP+O is used to iteratively determine correction values for correction table C. Without edge detection, every entry in C and every pixel in I is evaluated at 504. For each correction value (x,y) in C, and for each neighbor of (x,y) in C, a difference DIFF is computed. As mentioned previously, every correction value in C corresponds to a pixel in I, for example correction value C(x,y) corresponds to pixel I(x,y), and correction value C(neighbor) corresponds to pixel I(neighbor).

The DIFF may be computed by taking the difference between I(x,y)+C(x,y) and I(neighbor)+C(neighbor). If the absolute value of DIFF is within a range of values as defined by thresholds T1 and T2, then the correction value is updated. For example, whether T1>absolute value of DIFF>T2. Thresholds T1 and T2 may be predetermined values. The correction value C(x,y) for the current pixel is updated by subtracting a fraction of the DIFF from the current correction value. The fraction of the DIFF may be computed by dividing DIFF by a denominator, denom. The denominator denom, T1, and T2 may be input values that are set, and/or may be predetermined. The correction value of the neighbor C(neighbor) may be updated by adding the fraction of the DIFF (for example, DIFF/denom) to the current correction value of the neighbor. 504 is repeated iteratively for every entry in C, until the entire table is populated and updated.

When 504 is applied to a non-moving camera case, T1 is chosen to be a value such that pixel differences (DIFF) less than T1 are imperceptible to the eye. When 504 is applied to a moving camera case, T1 may be chosen to be a value such that the amount DIFF/denom is imperceptible to the eye when the pixel differences (DIFF) is less than T1. T2 is chosen to be smaller than T1 such that pixel differences less than T2 are so small as to not be worth correcting. T2 provides a lower limit on pixel differences in order to prevent over-convergence of the algorithm. Using a fraction of DIFF may compensate for temporal noise and the lack of edge detection, particularly for weak edges, because if the correction values get updated on a pixel and a neighbor that form a weak edge, the fractional DIFF can make the correction to the weak edge unnoticeable. In the alternative, as described in other embodiments using camera movement and edge detection, for weak edges, updating the correction values for a pixel and its neighbor forming a weak edge may result in blurring the edge even further.

According to an embodiment of the present invention, when the camera is moving, a weak edge that existed on one frame I may not be there or may have moved on frame I+1, so the edges may not be blurred, and the correction table update process using edge detection techniques described herein may be used. On the other hand, if the camera is stationary, and if a pixel and its neighbor, on this frame, form a weak edge, the iterative correction table update method may not noticeably blur the edge since the correction values are updated by fractions of DIFF.

Then at 506, when the correction table C is complete, it is added to processed image I from 502 to result in an output image with its non-uniformities corrected without camera movement or edge detection.

It should be appreciated that the specific steps illustrated in FIG. 5 provide a particular method of updating a correction table when the camera is stationary according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6 illustrates a simplified flowchart diagram of updating a correction table without edge detection according to an embodiment of the present invention, for example, as shown at 504 of FIG. 5. The method illustrated in FIG. 6 may be used for both motion-based and motionless algorithms to update correction table C.

At 601, a current pixel I(x,y) is provided. Subsequently at 602, neighbor correction values of C(x,y) are considered and determined, where C(x,y) is a correction value for the current pixel I(x,y). The method considers each neighbor of the current pixel before considering the next current pixel as described herein. Thus, each neighbor pixel of the current pixel is considered as shown in block 504 of FIG. 5.

At 604, the difference between the correction value for the current pixel and the correction value of its neighbor is determined as DIFF. The DIFF may be computed by taking the difference between I(x,y)+C(x,y) and I(neighbor)+C (neighbor). At 606, it is determined whether the absolute value of DIFF is within a range of values, for example, in a range between T2 and T1, with T2 being a lower bound and T1 being an upper bound. If NO, that is, the DIFF is not within the predetermined range defined by T1 and T2, then the method makes no update to table C and proceeds to the next neighbor (No path from 606 to 602). After all neighbors have been visited, the method proceeds to the next pixel as the new "current pixel" and proceeds again beginning at block 602.

If YES, the DIFF is within the range, to update the correction values, at 608, the correction value C(x,y) for the current pixel is updated by subtracting a fraction of the DIFF from the current correction value. The fraction of the DIFF may be DIFF divided by a denominator. At 610, the correction value of the neighbor C(neighbor) may be updated by adding the fraction of the DIFF (for example, DIFF/denom) to the current correction value of the neighbor.

Then, at 612, the next correction value in the correction table is evaluated, and its neighbor correction values are determined in 602, in which 602-612 are repeated iteratively for every entry in C, until the entire table is populated and updated.

In the embodiment shown in FIGS. 4-6, the infrared image correction is performed without an edge detection first before updating the correction table. Instead it determines DIFF, which is the difference between the pixel and its neighbor. If that difference DIFF is less than threshold T1 and greater than another threshold T2, then the correction value is updated. For the non-moving camera case, the thresholds T1 and T2 are set very close such that the range for DIFF is very small. Therefore, as shown in FIG. 4, when the camera is not moving, the correction table may still be incrementally updated to produce a fairly clean image to at least prevent the fixed-pattern noise from evolving and negatively affecting the image.

For the non-moving camera case, typical values for T1 and T2 may be 5-6 grayscale values for a 14-bit camera. Input values for T1 and T2 would depend on the bit depths of the camera. For example, for 14-bits there would be 16,384 grayscale values; thus the range between T1 and T2 would be 5-6 grayscale values out of 16,384. Although the camera is 14 bits, the camera is not necessarily detecting everything from zero up to 16,383, but may only be detecting just a small range within that total range. Therefore, these thresholds of 5-6 grayscale values are set small enough such that edges having these differences would be undetectable by the human eye. The fixed-pattern noise starts from zero, but as the camera heats up or cools down, the fixed pattern noise increases a little bit each time. These thresholds allow the fixed pattern noise to be corrected as it evolves and before it becomes perceptible.

For the moving camera case, T1 may be chosen to be a value such that the amount DIFF/denom is imperceptible to the eye when the pixel differences (DIFF) is less than T1. Accordingly, the correction table update process of FIGS. 5-6 helps to reduce fixed pattern noise. Because no edge detection is performed, some weak edges may be inadvertently updated, but only weak edges that are imperceptible to the human eye. In contrast, strong edges that are detectable to the human eye typically have a DIFF value of thousands of grayscale values.

It should be appreciated that the specific steps illustrated in FIG. 6 provide a particular method of updating a correction table when a camera is stationary according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
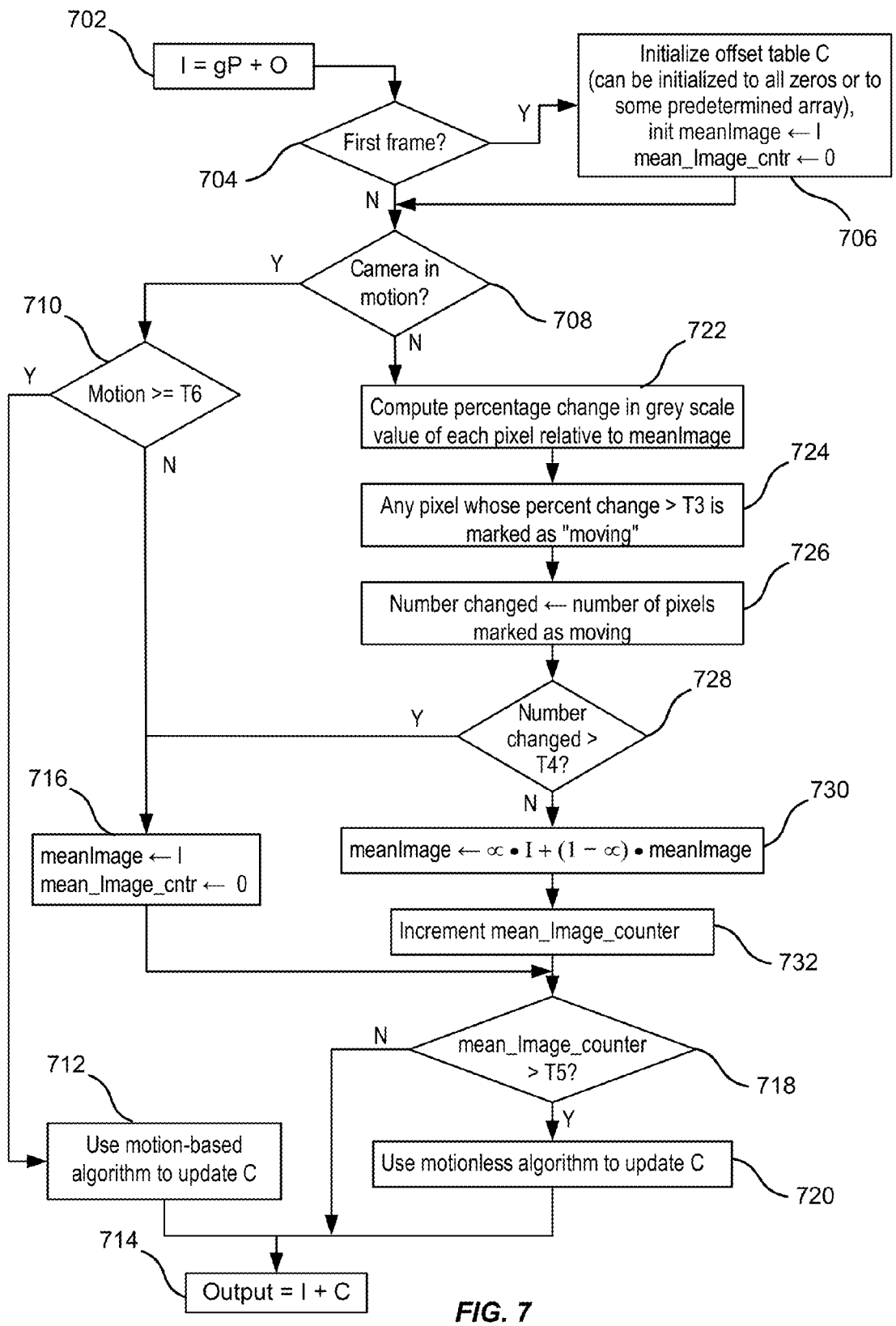
FIG. 7 is a simplified flowchart illustrating a method of correcting an infrared image according to another embodiment of the present invention.

FIG. 7 illustrates a flowchart of a method of correcting infrared images according to another embodiment of the invention. The method may receive a processed image I at 702, which comprises multiplying a raw image P with a gain table g and adding an offset table O. The gain table and offset table may be the same size as the raw image, such that each entry in the gain table corresponds to an entry in the offset and a pixel in the raw image.

At 704, the method includes determining whether I is the first frame. If it is the first frame, then the method includes, at 706, initializing a correction table C, which is also the same size as raw image P, the gain table g, and the offset table O. In an embodiment, correction table C may be initialized to have all the entries be zero's or to some predetermined array of values. Other parameters, such as a mean value of the processed image or a counter may also be set to predetermined values. For example, meanImage may be initialized to I=gP+O and mean_image_cntr may be set to 0. After the correction table C and other parameters are initialized, then the method proceeds to 708 to determine whether the camera is in motion.

If the current I is not the first frame, the method directly proceeds to 708 to determine whether the camera is in motion. If the camera is determined to be moving at 708, then the method proceeds to 710 to determine whether there is motion>T6 where T6 is a measure of camera motion. For example, if a motion detector is used to measure camera motion, T6 might be an accelerometer reading. If image processing techniques are used to detect camera motion, T6 might be in units of pixels. If motion>T6, then the method further includes, at 712, using a motion-based algorithm to update the correction table C. For example, the motion-based algorithm used may use prior edge detection as illustrated in FIG. 3, and blocks 208 and 210 of FIG. 2. In another embodiment, the motion-based algorithm may be implemented without edge detection, for example, as illustrated in FIG. 6 and block 504 of FIG. 5. The correction table C is then added to processed image I to result in corrected output image at 714.

If there is small motion<T6 determined at 710, then the method proceeds to 716 such that the mean image parameter is reset to I (=gP+0) and the mean image counter is reset to 0.

Alternatively, if at 708, the camera is determined to be stationary, then at 722, the method can further include computing a percentage change in greyscale value of each pixel relative to the corresponding pixel in the mean image (e.g., meanImage). Then at 724, any pixel having a percentage change greater than a threshold T3 is marked as moving. T3 may be a predetermined threshold. The number of pixels marked as moving are counted at 726 and saved as the number of pixels that have changed.

At 728, when the number of changed pixels has exceeded a threshold T4, the mean image parameter may then be reset to I (=gP+O) (e.g., meanImage=I) and the mean image counter may be reset to 0 (e.g., mean_Image_cntr=0). Alternatively, if the number of changed pixels has not exceed the threshold T4, then at 730, the mean image value is set to the sum of the processed image I multiplied by a constant $\alpha$ and a fraction of the previous mean image value, where constant $\alpha$ is less than 1, and the fraction is 1-$\alpha$. For example, meanImage=$\alpha$I+(1-$\alpha$)meanImage. After the mean image value is updated, then the mean image counter parameter is incremented at 732. T4 and $\alpha$ may be predetermined values.

If the mean image counter (e.g., mean_Image_cntr) is greater than a threshold value T5, then at 720 a motionless algorithm without edge detection is used to update the correction table C. For example, implementing the method illustrated in FIG. 6 and block 504 of FIG. 5 of updating correction table C without edge detection, where the input image is meanImage instead of I. When the correction table C is updated, then it is added to processed image I to output corrected output image at 714. If the mean image counter parameter is less than the threshold T5, then at 714, the processed image I is added to the previous correction table C to result in corrected output image. Thresholds T4, T5, and T6 may be predetermined values.

It should be appreciated that the specific steps illustrated in FIG. 7 provide a particular method of correcting an infrared image according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
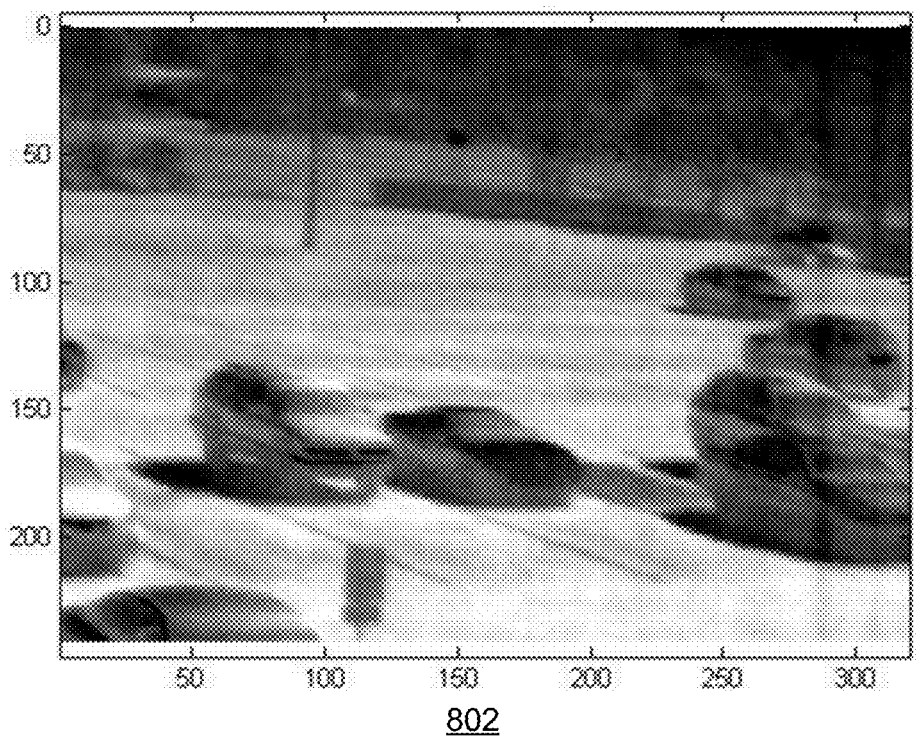
FIG. 8 is an example of input infrared image with drift and its respective output corrected infrared image according to embodiments of the present invention.
Figure 8:

FIG. 8 illustrates an example of an input image and its corresponding output image after correction methods performed according to embodiments of the invention. 802 is an input image of an actual infrared image with FPA drift, which can be observed as a cross-hatched pattern in the image. When 802 is processed using correction methods described in the present application, the result is 804, where the cross-hatched pattern of the FPA drift is significantly and visibly reduced.

Figure 9:
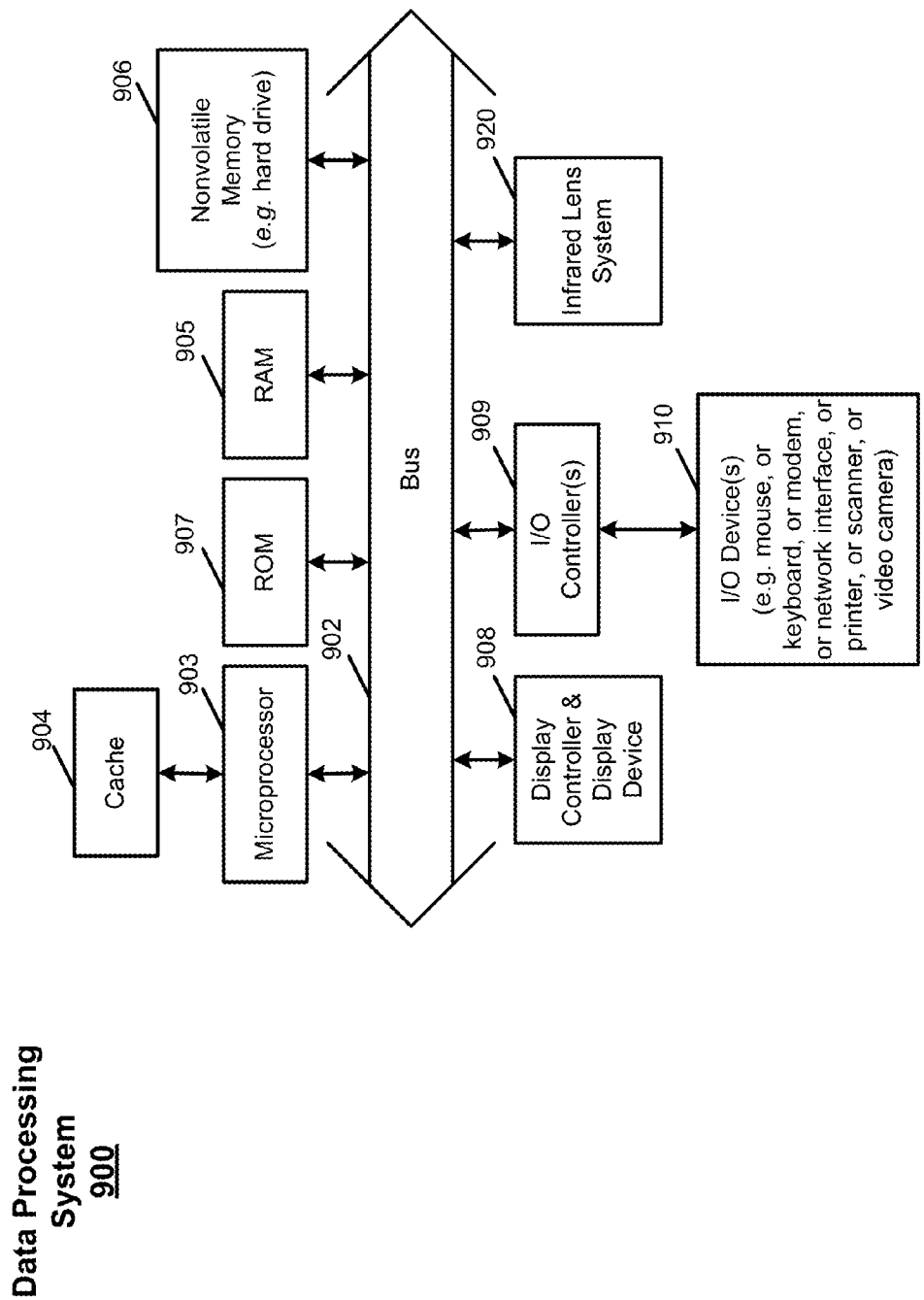
FIG. 9 is a high level schematic diagram illustrating a subsystem or component according to an embodiment of the present invention.

FIG. 9 is a high level schematic diagram illustrating a data processing system upon which the disclosed embodiments may be implemented in certain embodiments. Embodiments may be practiced with various computer system configurations such as infrared cameras, hand-held devices, microprocessor systems, microprocessor-based or programmable user electronics, minicomputers, mainframe computers and the like. As an example, the data processing system can be used to correct an infrared image in conjunction with an infrared lens system 920 as described throughout the present application, for example, providing for control of the imaging functions of the infrared lens system 920. The embodiments can also be practiced in distributed computing environments where tasks are performed by remote processing devices that are linked through a wire-based or wireless network. FIG. 9 shows one example of a data processing system, such as data processing system 900, which may be used with the present described embodiments. Note that while FIG. 9 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 9 may, for example, a personal computer (PC), workstation, tablet, smartphone or other hand-held wireless device, or any device having similar functionality.

As shown, the data processing system 901 includes a system bus 902 which is coupled to a microprocessor 903, a Read-Only Memory (ROM) 907, a volatile Random Access Memory (RAM) 905, as well as other nonvolatile memory 906. In the illustrated embodiment, microprocessor 903 is coupled to cache memory 904. System bus 902 can be adapted to interconnect these various components together and also interconnect components 903, 907, 905, and 906 to a display controller and display device 908, and to peripheral devices such as input/output ("I/O") devices 510. Types of I/O devices can include keyboards, modems, network interfaces, printers, scanners, video cameras, or other devices well known in the art. Typically, I/O devices 510 are coupled to the system bus 902 through I/O controllers 909. In one embodiment the I/O controller 909 includes a Universal Serial Bus ("USB") adapter for controlling USB peripherals or other type of bus adapter.

RAM 905 can be implemented as dynamic RAM ("DRAM") which requires power continually in order to refresh or maintain the data in the memory. The other nonvolatile memory 906 can be a magnetic hard drive, magnetic optical drive, optical drive, DVD RAM, or other type of memory system that maintains data after power is removed from the system. While FIG. 3 shows that nonvolatile memory 906 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 500, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of correcting an infrared image, the method comprising:
  providing a processor;
  receiving the infrared image from a camera, the infrared image comprising a plurality of pixels arranged in an input image array, a first pixel in the plurality of pixels having a first pixel value and one or more neighbor pixels with one or more neighbor pixel values, wherein the first pixel and the one or more neighbor pixels are associated with an object in the image, the one or more neighbor pixels being adjacent to the first pixel in the input image array;
  providing a correction array having a plurality of correction pixel values;
  generating a corrected image array by adding the first pixel value to a correction pixel value in the correction array;
  detecting edges in the corrected image array;
  masking the detected edges in the corrected image array;
  updating, by the processor, the correction array, for each correction pixel value in the correction array; and
  providing an output image array based on the correction array and the input image array.

2. The method of claim 1 further comprising determining that the camera is moving.

3. The method of claim 2 wherein determining that the camera is moving comprises using a motion sensor in the camera.

4. The method of claim 2 wherein determining that the camera is moving comprises using image processing-based techniques.

5. The method of claim 1 wherein updating the correction array comprises:
   determining that the first pixel value is not an edge;
   for each of the one or more neighbor pixel values, determining that the neighbor pixel value is not an edge;
   computing a difference between the first pixel value and the one or more neighbor pixel values; and
   updating the correction pixel values based on the difference.

6. The method of claim 5 wherein updating the correction array further comprises determining that an absolute value of the difference is within a range.

7. The method of claim 5 wherein updating the correction pixel values based on the difference comprises dividing the difference by a denominator, wherein the denominator is a predetermined value.

8. The method of claim 5 wherein updating the correction pixel values in the correction array comprises:
   adding the difference to a previous neighbor correction value to update a neighbor correction value; and
   subtracting the difference from a previous correction value to update a correction value.

9. The method of claim 8 wherein a sum of a first portion of the difference and a second portion of the difference is equal to the difference.

10. The method of claim 1 wherein the infrared image from the camera is a raw image, and the input image array comprises multiplying the raw image by a gain array, wherein the gain array is a predetermined array of values.

\* \* \* \* \*